Figure 4:
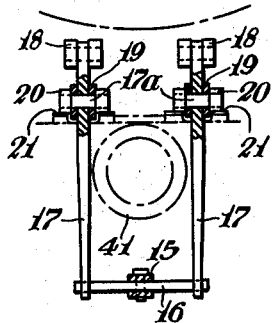

April 7, 1953  E. G. MUELLER  2,633,935
BRAKE MECHANISM
Filed May 29, 1948  3 Sheets-Sheet 1
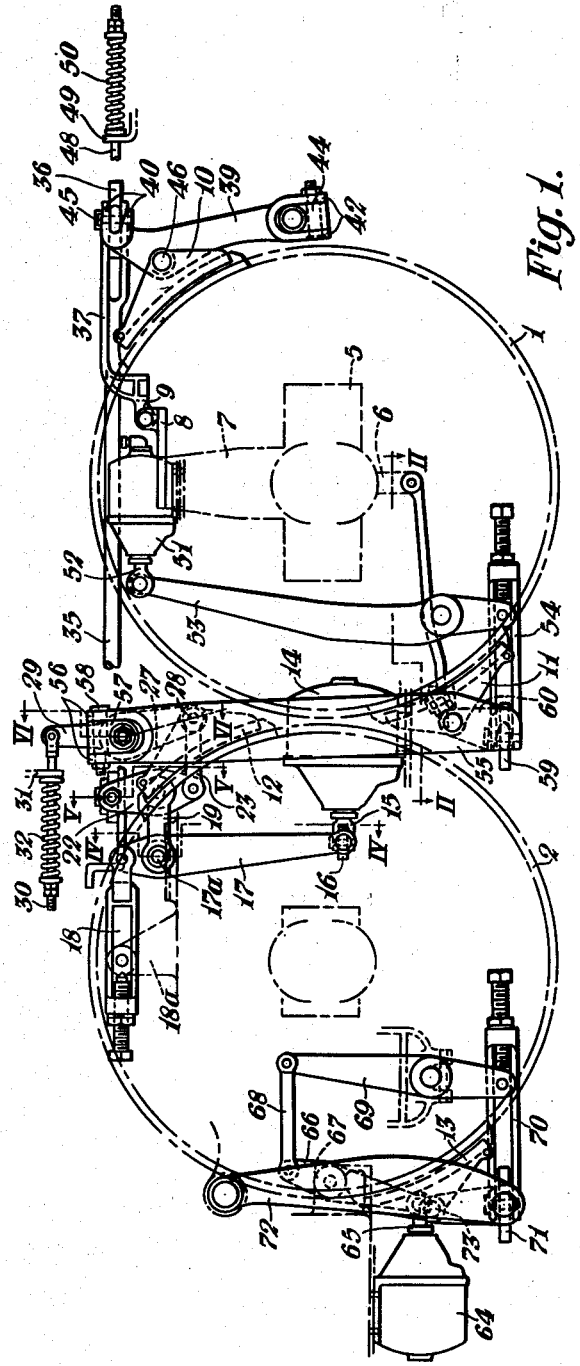
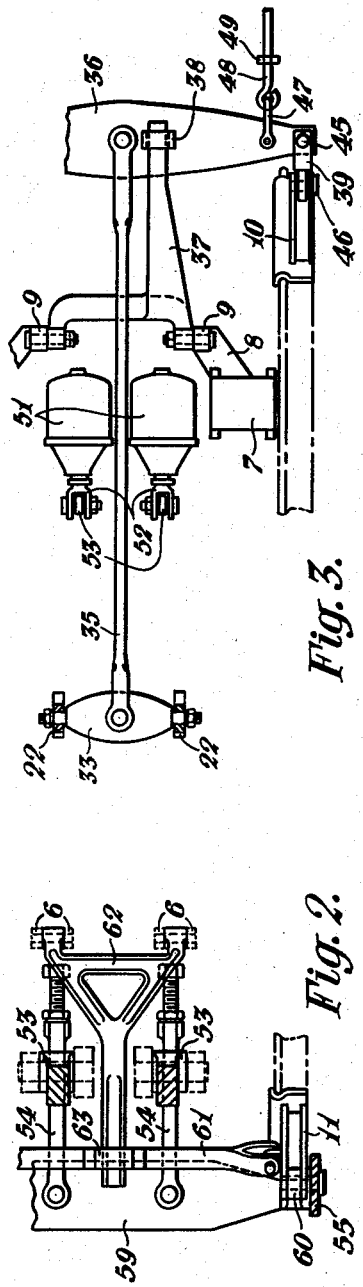
INVENTOR.
Emil G. Mueller
BY
HIS ATTORNEY April 7, 1953  E. G. MUELLER  2,633,935
BRAKE MECHANISM Filed May 29, 1948  3 Sheets-Sheet 2

INVENTOR.
Emil G. Mueller
BY
HIS ATTORNEY

April 7, 1953 — E. G. MUELLER — 2,633,935
BRAKE MECHANISM
Filed May 29, 1948 — 3 Sheets-Sheet 3

INVENTOR.
Emil G. Mueller
BY
HIS ATTORNEY

Patented Apr. 7, 1953

2,633,935

UNITED STATES PATENT OFFICE 2,633,935

BRAKE MECHANISM

Emil G. Mueller, Churchill Borough, Pa., assignor to The American Brake Company, Swissvale, Pa., a corporation of Missouri Application May 29, 1948, Serial No. 30,151

13 Claims. (Cl. 188—46)

My invention relates to brake mechanism, and particularly to brake mechanism for applying clasp brakes to the driving wheels of locomotives.

In modern high speed locomotives it is frequently desirable to arrange adjacent pairs of driving wheels as closely together as the necessary clearance between the wheels themselves will permit in order to keep the overall length of the locomotive to a minimum and thereby facilitate the negotiation of curves. It is also frequently desirable to arrange one or more pairs of driving wheels for lateral movement with respect to the locomotive frame to enable the wheels to freely follow the track rails on curves or uneven stretches of track without undue side-thrust of the wheels on the rails.

When the driving wheels of a locomotive are arranged closely together in the manner described, there is, of course, no room for inserting any part of the brake mechanism directly between the wheels near the horizontal plane through their centers. At the same time available space between the wheels above their centers is frequently limited by the valve gear or other parts of the locomotive, while the space between the wheels below their centers is limited by the diameters of the wheels and the necessary track clearance. As a result, if the wheels have relatively small diameters, the only way in which clasp brakes can be applied to the wheels is to place the two shoes which engage the wheels at their contiguous sides one above and the other below the horizontal plane passing through the wheel centers. With this arrangement the two shoes between the adjacent closely spaced wheels are oppositely disposed and cooperate with different wheels, thus making it difficult to provide a satisfactory mechanism for properly operating and supporting the brake shoes.

One object of my invention is to provide an improved mechanism which makes it possible to satisfactorily support and operate clasp brakes for the wheels of a locomotive arranged as above described.

Another object of my invention is to provide an improved brake hanger assembly capable of supporting the two brake shoes between the adjacent closely spaced driving wheels in such manner that the minimum permissible spacing between the driving wheels need be no greater than that required for the wheels to clear themselves, and which at the same time will permit the brake shoes associated with the laterally movable wheels to be readily moved laterally a sufficient amount to maintain them in lateral alignment with the wheels.

A further object of my invention is to provide brake mechanism which can be satisfactorily mounted within the limited space available for the brake rigging on a locomotive of the type described without interference from or with the other parts of the locomotive.

Another object of my invention is to provide an improved arrangement of brake cylinders and rigging for clasp brakes on a four-wheel truck.

Another object is to provide an improved arrangement for supporting adjacent brake shoes for cooperation with adjacent wheels of a truck wherein one wheel is permitted to move laterally with respect to the truck frame and the next wheel is not.

Another object is to provide an improved arrangement for transmitting operating forces to a brake shoe so as to permit that shoe to move laterally with its associated wheel.

A further object is to provide an improved linkage for transmitting motion between generally parallel rods which are separated by an intervening obstruction.

A further object is to provide an improved crank arrangement for supporting and operating a brake shoe adapted to engage a wheel not subject to lateral movement with respect to the truck on which it is mounted.

Brake mechanism embodying my present invention is an improvement upon that described and claimed in my prior Letters Patent of the United States No. 2,242,015, granted May 13, 1941, No. 2,275,916, granted March 10, 1942, and No. 2,360,967, granted October 24, 1944.

My invention is illustrated herein as applied to the wheels of a locomotive having two driving trucks of four wheels each. Each wheel is provided with two substantially diametrically opposite brake shoes. In order that the two driving wheels on each side of a truck may be closely spaced, the front shoe on each wheel is located above a horizontal plane passing through the wheel centers, and the rear shoe is located below that horizontal plane. In order to obtain the required clearances between the brake structure and the various parts of the locomotive, I provide, for each truck, one brake cylinder and rigging arrangement for operating one group of four shoes on corresponding sides of the four wheels, a second cylinder and rigging arrangement for operating the two shoes on the opposite sides of two of the wheels, and a third brake cylinder and rigging arrangement for operating the two shoes on the opposite sides of the other two wheels.

On both trucks, the front wheels are arranged to move laterally with respect to the locomotive, and the rear wheels are not. I provide improved compact structure for supporting the front shoe of the rear wheel and the rear shoe of the front wheel, comprising a crank journaled in the locomotive frame and having an arm which carries the brakehead for the front shoe of the rear wheel. Suitable means are provided for rotating this crank to operate that brake shoe. The brake hanger for the rear shoe of the front wheel is universally pivoted on an extension of the crankshaft.

For the front shoes of certain of the wheels which move laterally with respect to the locomotive frame, I provide improved brake operating structure including a brake hanger which moves laterally with the wheels, and a non-rigid connection between the brake hanger and the brake beam which operates it, which connection permits lateral movement of the hanger with respect to the beam while maintaining the operative relationship of the hanger and beam.

The operation of certain of the brake shoes requires the transmission of motion between two parallel rods which are located on opposite sides of an intervening obstruction, in this case a steam pipe. I connect these two rods by means of a linkage including four equalizer levers which in a sense form a rectangle around the steam pipe, although not all located in the same place.

Other objects and characteristic features of my invention will become apparent as the description proceeds.

I shall describe one form of brake mechanism embodying my invention, and shall then point out the novel features thereof in claims.

Figure 5:
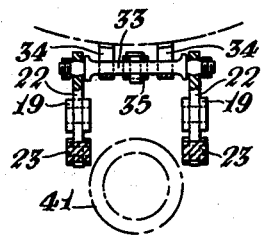
Figure 6:
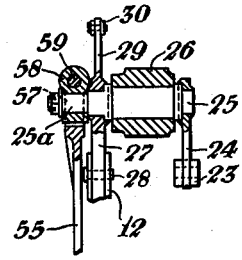
Figure 9:
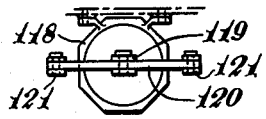
Figure 10:
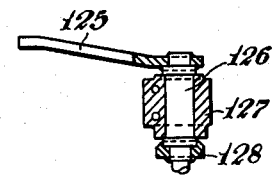
Figure 11:
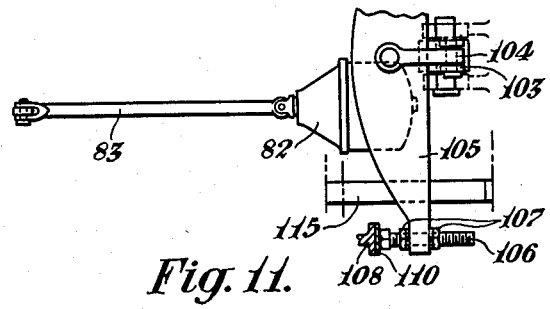
Figure 7:
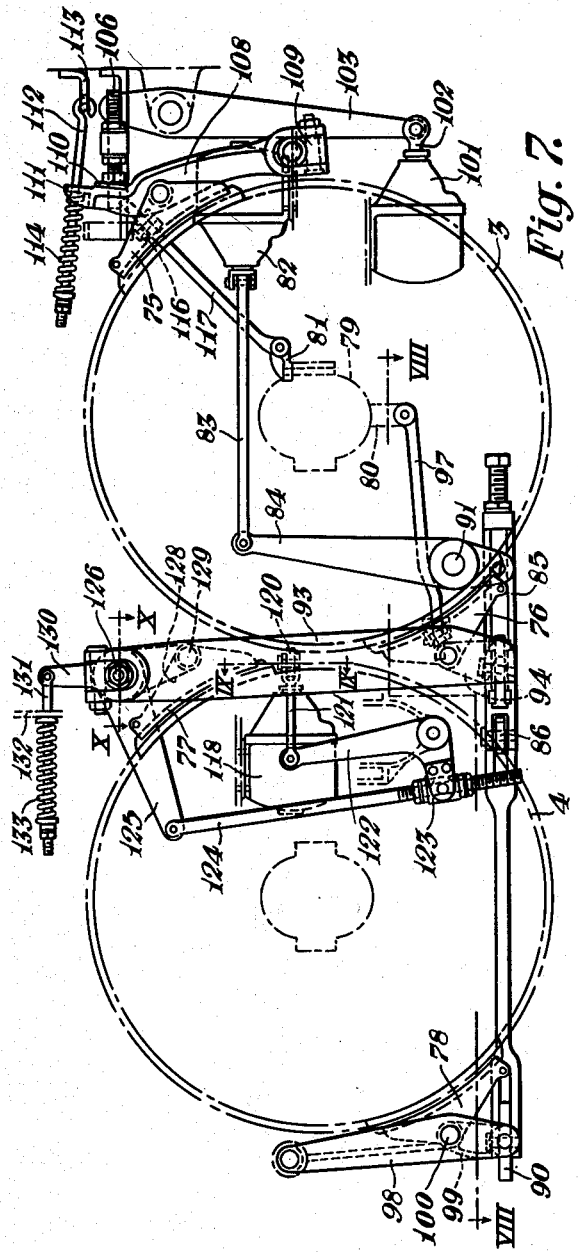
Figure 8:
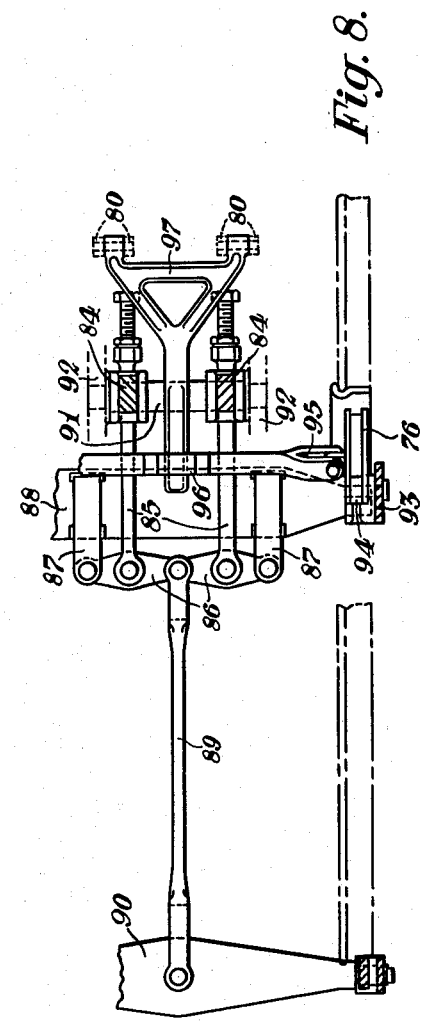

In the accompanying drawings, Fig. 1 is a side elevational view of the front driving truck of a locomotive of the type described having applied thereto brake mechanism embodying my invention. Fig. 2 is a fragmentary sectional view taken on the line II—II of Fig. 1, looking in the direction of the arrow. Fig. 3 is a fragmentary top plan view of the brake mechanism of Fig. 1, certain of the parts being omitted for the sake of clearness. Figs. 4, 5, and 6 are fragmentary sectional views taken on the lines IV—IV, V—V, and VI—VI, respectively, of Fig. 1. Fig. 7 is a side elevational view of the rear driving truck of the locomotive whose front truck is shown in Fig. 1, having applied thereto brake mechanism embodying my invention. Figs. 8, 9, and 10 are sectional views taken on the lines VIII—VIII, IX—IX, and X—X of Fig. 7, respectively, illustrating certain details of the brake operating structure. Fig. 11 is a fragmentary top plan view, showing part of the brake rigging for the front shoe of the front wheel of the truck illustrated in Fig. 7.

The brake mechanism disclosed herein is for the right side of the locomotive. The left side rigging is for the most part omitted, although certain parts of it are disclosed for the sake of clarity. It should be understood that the omitted portions of the left side rigging are enantiomorphic counterparts of the corresponding portions of the right side rigging.

Referring to the drawings, the locomotive to which I have shown my invention applied is of the type having four pairs of driving wheels, numbered 1, 2, 3, and 4, respectively. The first and second pairs are driven from a first set of steam cylinders and the third and fourth pairs are driven from a second set of steam cylinders. All four pairs of driving wheels are mounted in a rigid frame, which is the frame of the locomotive.

Each pair of driving wheels is mounted on an axle comprising a part of a roller bearing axle assembly, the construction of which forms no part of my present invention, and is therefore not shown in detail in the drawings. The axle assemblies for the first and third pairs of driving wheels 1 and 3 are journaled at each end in journal boxes (not shown) formed in the side member of the frame of the locomotive in such a manner that the journal box is free to slide vertically and laterally with respect to the frame, and each of these two axle assemblies includes a member 5 which connects the two journal boxes and is movable laterally therewith. This member may assume a variety of forms depending upon the particular type of roller bearing construction employed. This member is referred to in the art by a variety of different designations, but for convenience I shall hereinafter refer to it as an axle housing, although it should be distinctly understood that insofar as my present invention is concerned its exact construction is immaterial so long as it is a non-rotatable member which moves laterally in response to lateral movement of the associated driving wheels.

The wheel and axle assembly just described is free to move laterally through a sufficient distance to permit the wheels to freely follow the track rails on curves without causing undue sidethrust of the flanges of one or the other of the wheels on the adjacent rails. This lateral distance in actual practice is about one inch in either direction from the normal central position.

The wheel and axle assemblies for the second and fourth pairs of driving wheels 2 and 4 are of the usual construction, and are not adapted to move any appreciable distance laterally with respect to the truck frame. Due to the usual operating clearances these wheels and axle assemblies may at times be moved laterally, but such movements are so slight that the assembly at no time strains the brake rigging or interferes with its proper operation. Insofar as my present invention is concerned, the second and fourth wheel and axle assemblies may be considered as fixed against lateral movement.

The driving wheels 1 and 2 of the first truck and 3 and 4 of the second truck are closely spaced, the distance between the wheels being preferably no greater than that required to keep them clear of one another. The reason for this close spacing is to decrease the overall length of the locomotive to a minimum so as to increase its ability to negotiate curves.

Front truck—Figs. 1 to 6

The axle housing 5 is provided with two pairs of spaced depending lugs 6 (see Fig. 2). The axle housing 5 also carries a spring saddle 7 to which is attached a bracket 8 having a lug 9 formed thereon. The purpose of the lugs 6 and 9 will appear presently.

The first pair of drivers 1 is provided with front brakeheads 10 and rear brakeheads 11. The second drivers 2 are provided with front brakeheads 12 and rear brakeheads 13. Each brakehead carries the usual brake shoe which brakingly engages the surface of the wheel.

The front brakeheads 10 and 12 of the drivers 1 and 2 on both sides of the truck are operated by a single brake cylinder 14 through its associated rigging. The piston (not shown) within cylinder 14 operates a piston rod 15 which is pivotally connected at its outer end to the center of a transverse equalizer lever 16 (see Fig. 4), which extends horizontally across the truck. The ends of equalizer lever 16 are pivotally connected to a pair of vertically disposed brake cylinder levers 17. The upper ends of the brake cylinder levers 17 are connected by slack adjuster links 18 of conventional construction, to lugs 18a formed in the locomotive frame. At intermediate points, the brake cylinder levers 17 are connected by pins 17a to pull links 19. The pins 17a are extended beyond the links 19 in both directions and at their ends carry hardened steel rollers 20, which cooperate with wear plates 21 on the locomotive frame to support the brake cylinder levers 17 and their associated structure.

The opposite ends of the pull links 19 are connected respectively to intermediate points on vertically extending equalizer levers 22. The lower ends of equalizer levers 22 are pivotally connected to links 23. The opposite end of each of the links 23 (only one of which is shown) is pivotally connected (see Fig. 6) to the lower end of a crank arm 24 carried by a crankshaft 25 journaled in a bearing block 26 which is rigidly attached to the locomotive frame. Attached to the outer end of crankshaft 25 is a depending brakehead arm 27 connected by means of a brakehead pin 28 to the brakehead 12 associated with drive wheel 2. Also attached to the outer end of crankshaft 25 is a spring release arm 29, which extends upwardly and is pivotally attached at its end to a spring rod 30, which extends through a lug 31 formed on the locomotive frame, and on the opposite side of lug 31 carries a release spring 32 which biases the spring rod 30 in a direction to move the brakehead 12 away from a brake applying position.

The upper ends of the vertical equalizer levers 22 are pivotally connected to the opposite ends of a second transverse equalizer lever 33. (See Figs. 3 and 5.) The transverse equalizer lever 33 is slidably supported on a pair of brackets 34 attached to the locomotive frame, and is pivotally attached at its center to an elongated pull rod 35 which extends forwardly of the locomotive and is pivoted at its other end to a brake beam 36.

A guide arm 37 is pivotally attached to the lugs 9 for rotation about a horizontal transverse axis, and has its free end received in a lug 38 carried by the brake beam 36. The guide arm 37 serves to move the brake beam 36 laterally with the movement of the wheel and axle assembly which includes the wheels 1.

The brake beam 36 is supported for swinging movement toward and away from the wheels 1 by means of a pair of supporting levers 39, each of which is provided at its upper end with spaced jaws 40 (see Fig. 1) to receive one end of the brake beam 36. Each lever 39 is provided at its lower end with other spaced jaws 42 which receive a clevis block 44 forming a part of a universal joint connecting the lever 39 to the locomotive frame. This universal joint structure is more completely described in my previously issued Patent No. 2,360,967, to which reference has been made.

Pins 45 extend through the ends of the brake beam 36 and attach it to the upper ends of the supporting levers 39. Each lever 39 carries one of the brakeheads 10 by means of a brakehead pin 46. Each end of the brake beam 36 is connected by means of a link 47 to a spring release rod 48 which extends through a lug 49 formed on the locomotive frame and carries a release spring 50 by means of suitable retainers. The release spring 50 biases the brake beam 36 in a direction to move its associated brake shoes to a brake releasing position.

Some of the complication of the linkage which connects the piston rod 15 to the pull rod 35 is made necessary by the fact that these two rods lie on diametrically opposite sides of a steam pipe 41 (see Figs. 4 and 5), in the particular locomotive shown here. The generally rectangular arrangement of two horizontal equalizers 16 and 33, and two vertical equalizers 22, and their connecting links, transmits motion around the obstruction between the rods 15 and 35.

The rear shoes 11 on the front drivers 1 are operated by two brake cylinders 51 through a rigging which includes piston rods 52, brake cylinder levers 53, slack adjuster links 54, a brake beam 59, and brake hangers 55. Each brake hanger 55 is pivotally mounted at its upper end on an extension 25a of the crankshaft 25 (see Fig. 6). The upper end of brake hanger 55 is provided with spaced jaws 56 between which is received a clevis block 57. A pin 58 pivotally connects the clevis block 57 to the spaced jaws 56. The clevis block 57 is in turn pivotally mounted on extension 25a of crankshaft 25 (see Fig. 6). It may be seen that the clevis block 57 provides a type of universal joint support which permits the hanger 55 to swing in a vertical plane between brake applying and brake releasing positions, and also to swing transversely of the truck so that the brakehead 11 may follow the transverse movement of the wheels 1.

The lower ends of the hangers 55 are connected by a brake beam 59.

It may be seen from Fig. 6 that the brake hanger 55 lies outside the plane of the wheels 1 and 2. At its lower end, it is provided with an inwardly directed extension 60, which pivotally carries the brakehead 11. The brakeheads 11 on the opposite sides of the truck are connected by a tie rod 61 (see Fig. 2). A guide arm 62 is pivotally mounted in the lugs 6 for rotation about a horizontal transverse axis, and extends through a lug 63 formed on the tie rod 61. The guide arm 62 and the lug 63 insure that the tie rod and the brakeheads 11 move laterally as a unit with the axle housing on which the lugs 6 are formed. The brakeheads 11 are thereby kept in lateral alignment with the wheels 1.

The rear brakeheads 13 on the second driver 2 are operated by a brake cylinder 64 through a rigging which includes a piston rod 65 and a brake cylinder lever 66 extending vertically and pivotally attached at its lower end to the piston rod 65. The lever 66 is pivotally supported at a point near its upper end on a lug 67 formed on the locomotive frame. The upper end of brake cylinder lever 66 is connected by a link 68 to the upper end of another vertical lever 69 which extends generally parallel to lever 66. The lever 69 is pivotally mounted at an intermediate point near its lower end on the locomotive frame. The lower end of lever 69 is pivotally attached to a slack adjuster link 70 of conventional construction, whose opposite end is pivotally connected to the mid point of a brake beam 71 extending transversely of the locomotive truck. At its ends, the brake beam 71 is pivotally supported by brake hangers 72, which carry the brakeheads 13 by means of brakehead pins 73.

When it is desired to apply the brakes, fluid pressure is simultaneously supplied to all the brake cylinders 14, 51, and 64. The fluid supplied to cylinder 14 moves piston rod 15 to the left, as it appears in Fig. 1, thereby moving equalizer lever 16 to the left and carrying the lower ends of brake cylinder levers 17 to the left. Levers 17 rotate about their upper ends as a fulcrum, carrying the links 19 to the left and thereby moving the vertical equalizer levers 22 to the left also. This leftward movement of the equalizer levers 22 is communicated through links 23 to the brakeheads 12 on the front brake shoes of the second driver 2. At the same time, it is communicated through the upper transverse equalizer lever 33 and pull rod 35 to brake beam 36 and thereby to the brake supporting levers 39 and brakeheads 10 on the front shoes of the first driver 1. Therefore, it may be seen that all four front shoes of the drive wheels 1 and 2 are operated simultaneously by the brake cylinder 14.

At the same time, brake cylinders 51 act through levers 53, links 54, and brake beam 59 to operate the rear brakeheads 11 on the front wheels 1. Also, brake cylinder 64 acts through piston rod 65, lever 66, link 68, lever 69, and link 70 to operate brake beam 71 and apply the brake shoes on the brakeheads 13 into braking engagement with the rear drivers 2.

When it is desired to release the brakes, the release springs (not shown) in the several brake cylinders act to move their associated rigging to the brake releasing position. This releasing movement is aided in the case of the front heads 12 by the release springs 32 and in the case of the front heads 11 by the release springs 50.

When the front drivers 1 move laterally, the motion is transmitted through guide arm 37 and brake beam 36 to the front brake supporting levers 39, so that the brakeheads 11 follow such lateral movement. The lateral movement is also communicated through the guide arm 62 and the tie rod 61 to the rear brake shoes 11 on the front drivers 1. Lateral movement of the front brake hangers 39 and the rear brake hangers 55 associated with the front drivers 1 is permitted by their universal joint suspension including the clevis blocks 44 and 57.

*Rear truck—Figs. 7 to 11*

Figs. 7 to 11 illustrate the braking mechanism for the rear truck of the locomotive whose front truck is illustrated in Figs. 1 to 6. This rear truck includes drive wheels 3 and 4. The drive wheels 3 are provided with front brakeheads 75 and rear brakeheads 76. The drive wheels 4 are provided with front brakeheads 77 and rear brakeheads 78. Each brakehead supports a brake shoe of usual construction.

As in the case of the drive wheels 1, the drive wheels 3 are carried in an axle housing generally indicated at 79, and provided with downwardly depending lugs 80. The axle housing 79 also is provided with a bracket 81.

The rear brakeheads 76 and 78 of both drive wheels 3 and 4 are operated by brake cylinders 82, through rigging which includes push rods 83, cylinder levers 84, slack adjuster links 85, equalizer levers 86, push connections 87, a brake beam 88 which operates brakeheads 76, a pull rod 89, and brake beam 90 which operate brakeheads 78.

The cylinder levers 84 are pivotally supported on a shaft 91 journaled in bearing blocks 92 cast integrally with the frame of the locomotive. The ends of the brake beam 88 are supported by brake hanger levers 93 which correspond generally to the brake hanger levers 55 of Fig. 1 and are supported at their upper ends in a similar manner. The lower ends of brake hangers 93 are provided with inward extensions 94 on which the brakeheads 76 are pivoted. The brakeheads 76 on opposite sides of the locomotive are connected by a tie rod 95. Near its center this tie rod 95 is provided with a lug 96 to receive a guide arm 97 pivoted on the lugs 80 attached to the axle housing 79.

The ends of brake beam 90 are supported by brake hanger levers 98 having inward extensions 99 at their lower ends, on which extensions the brakeheads 78 are pivoted by means of brakehead pins 100.

The brakeheads 75 are operated by a brake cylinder 101 through a linkage including a piston rod 102, a brake cylinder lever 103, a push connection 104 (see Fig. 11), and a brake beam 105. Each end of brake beam 105 carries a horizontally extending adjusting screw 106 held in place in the brake beam 105 by means of lock nuts 107. Each brakehead 75 is pivotally attached to a brake supporting lever 108. The levers 108 are mounted at their lower ends on universal joints 109 which permit the brakeheads 75 to follow the lateral movement of the wheels 3. Near its upper end, each lever 108 is provided with a wear plate 110 in alignment with the head of adjusting screw 106. Each wear plate 110 is wider than its associated adjusting screw 106, so that as the brake hangers 108 move laterally with the wheels 3, the wear plates 110 remain in alignment with the screws 106, even though the screws 106 and the brake beam 105 do not move laterally.

At its upper extremity, each lever 108 is provided with an apertured lug 111 to receive a spring rod 112. The rod 112 is pivotally connected at one end to a bracket 113 attached to the locomotive frame. On the opposite side of lug 111 from the bracket 113, the rod 112 carries a release spring 114. Suitable retainers are provided on the spring rod 112 for retaining the release spring 114. The release spring 114 biases the supporting lever 108 in a brake releasing direction, and so maintains the wear plate 110 in engagement with the head of adjusting screw 106. The brake beam 105 is supported in brackets 115 attached to the locomotive frame.

The brakeheads 75 on opposite sides of the truck are connected by means of a tie rod 116. A guide arm 117 is pivoted at one end on the bracket 81 of the axle housing 79 and is received at its opposite end in a lug on the tie rod 116. The guide arm 117 insures that the tie rod 116, together with the brakeheads 75 and the brake hangers 108 move laterally with the lateral movement of the wheels 3 and their axle housing 79.

The brakeheads 77 associated with the front shoes of the drive wheels 4 are operated by a brake cylinder 118. The cylinder 118 drives a piston rod 119 (see Fig. 9) connected at its outer end to the mid point of an equalizer lever 120. The ends of equalizer lever 120 are pivotally connected to pull rods 121, whose opposite ends are pivotally attached to vertically disposed brake cylinder levers in the form of bell-crank levers 122. The bell crank lever 122 has a long arm connected to the pull rod 121 and a short arm connected through a slack adjuster trunnion 123 to a push rod 124. The other end of push rod 124 is pivotally connected to a crank arm 125 fixed on a crankshaft 126, which is journaled in a bearing block 127 (see Fig. 10) attached by suitable means to the frame of the locomotive. The crankshaft 126 carries a brakehead arm 128, on which the brakehead 77 is pivoted by means of a brakehead pin 129. The crankshaft 126 also carries a release spring arm 130 pivotally attached at its end to a spring rod 131. The rod 131 extends through a lug 132 connected to the locomotive frame and carries a release spring 133 by means of suitable spring retainers. The release spring 133 acts through rod 131 and arm 130 to bias the brakeheads 77 for movement in a brake releasing direction. The construction of crankshaft 126 and its related parts is generally similar to that of crankshaft 25 of Figs. 1 and 6.

The brakes are applied on both trucks simultaneously. The application of the brakes on the rear truck is accomplished by supplying fluid under pressure to the cylinders 82, 101, and 118. The cylinders 82 act through the push rods 83, cylinder levers 84, slack adjuster links 85, equalizers 86, push connections 87, and brake beams 88 to operate the rear brakeheads 76 on the wheels 3 to braking position. At the same time, the same cylinders 82 act through equalizers 86, pull rod 89 and brake beam 90 to operate the brakeheads 78 on the wheels 4 to braking position.

Simultaneously, cylinder 101 operates cylinder lever 103, push connection 104, and brake beam 105, to move the adjusting screws 106 and thereby the brake supporting levers 108 and brakeheads 75 into braking position. At the same time, the brake cylinder 118 operates through pull links 121, bell-crank levers 122, push rods 124, crank arms 125, crankshafts 126, and brakehead arms 128 to operate the brakeheads 75 into braking position.

When it is desired to release the brakes, the several cylinders are exhausted to atmosphere. At this time, the internal springs in the various cylinders move the brake shoes to brake releasing position. This releasing action is aided in the case of the shoes 75 by the release springs 114 and in the case of the shoes 77 by the release springs 133.

When the wheels 3 move laterally with respect to the locomotive frame, the front brakeheads 75 are carried with it by the guide arm 117 acting through the tie rod 116. The rear brakeheads 76 are carried with the wheels 3 by the guide arm 97 acting through the tie rod 95 on the brakeheads 76.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. Brake mechanism for a wheel, comprising a crankshaft, a brake shoe adapted to brakingly engage the wheel, a brakehead for supporting the shoe, a brakehead arm on the crankshaft and pivotally supporting the brakehead, means for rotating the crankshaft to bring the shoe into braking engagement with the wheel, a release spring arm on the crankshaft, and a release spring biasing the arm in a brake releasing direction.

2. Brake mechanism for a pair of wheels on opposite ends of an axle, comprising a brake cylinder and piston, an equalizer lever extending generally parallel to the axle, a piston rod connecting the piston to an intermediate point on the equalizer lever, and, for each wheel, a brake cylinder lever operatively connected to one end of the equalizer lever, a crankshaft, a crank arm on the crankshaft, a linkage connecting the brake cylinder lever to the crank arm, a brake shoe adapted to brakingly engage the wheel, a brakehead supporting the shoe, and a brakehead arm on the crankshaft and pivotally supporting the brakehead.

3. Brake mechanism for a vehicle wheel, comprising a brake cylinder and piston, a piston rod for said piston, a brake cylinder lever operatively connected at one end to the piston rod, a slack adjuster link connecting the other end of the brake cylinder lever to a pivot fixed on the vehicle, a crankshaft, a crank arm on the crankshaft, a linkage connecting an intermediate point on the brake cylinder lever to the crank arm, a brake shoe adapted to brakingly engage the wheel, a brakehead for supporting the shoe, and a brakehead arm on the crankshaft and pivotally supporting the brakehead.

4. Brake mechanism for a wheel, comprising a brake cylinder and piston, a piston rod for said piston, a bell-crank lever having one arm operatively connected to the piston rod, a crankshaft, a crank arm on the crankshaft, a slack adjuster link connecting the other arm of the bellcrank lever to the crank arm, a brake shoe adapted to brakingly engage the wheel, a brakehead for supporting the shoe, and a brakehead arm on the crankshaft and pivotally supporting the brakehead.

5. Brake mechanism for operating brake shoes on the same sides of the wheels at the opposite ends of an axle, comprising a brake cylinder and piston, a first transverse equalizer lever, a piston rod connecting the piston to an intermediate point on the equalizer lever, a pair of vertical equalizer levers, means operatively connecting the ends of the transverse equalizer lever to intermediate points on the vertical equalizer levers, a second transverse equalizer lever connected at its ends to the upper ends of said vertical equalizer levers, and a pair of linkages connecting the lower ends of the vertical equalizer levers with the brake shoes, each said linkage comprising a crankshaft, a crank arm on the crankshaft, a link connecting the lower end of the vertical equalizer lever to the crank arm, a breakhead supporting the shoe, and a brakehead arm on the crankshaft and pivotally supporting the brakehead.

6. Brake mechanism for a four-wheel truck having brake shoes on the same sides of all four wheels comprising a brake cylinder and piston, a first transverse equalizer lever, a piston rod connecting the piston to an intermediate point on the equalizer lever, a pair of vertically disposed cylinder levers connected to the opposite ends of the equalizer lever, a pair of vertical equalizer levers extending generally parallel to the respective cylinder levers, a pair of links, each link connecting an intermediate point on one cylinder lever to an intermediate point on the associated vertical equalizer lever, a pair of linkages connecting the lower ends of the vertical equalizer levers with the brake shoes on one pair of opposite wheels on the truck, a second transverse equalizer lever connected at its ends to the upper ends of said vertical equalizer levers, means including a brake beam operatively connecting the brake shoes on the other pair of opposite wheels on the truck, and a rod pivotally connected at one end to an intermediate point on said second transverse equalizer lever and at its opposite end to an intermediate point on said brake beam.

7. Brake mechanism for a vehicle truck having two wheels on one side, two brake shoes located between said wheels for respectively engaging said wheels, a brakehead for each shoe, a crankshaft, a brakehead arm on said crankshaft and pivotally carrying one of said brake shoes, a brake hanger rotatable on said crankshaft and pivotally carrying the other of said brake shoes, means for rotating said crankshaft to operate said one brake shoe, and means for swinging the brake hanger to operate the other brake shoe.

8. Brake mechanism for a vehicle truck having closely spaced wheels, comprising upper and lower brake shoes located between the wheels and respectively above and below the point of minimum clearance between the wheels, a brakehead for each shoe, a crankshaft, a brakehead arm on said crankshaft and pivotally carrying one of said brake shoes, a brake hanger rotatable on said crankshaft and pivotally carrying the other of said brake shoes, means for rotating said crankshaft to operate said one brake shoe, and means for swinging the brake hanger to operate the other brake shoe.

9. Brake mechanism for operating brake shoes on the same sides of the wheels at the opposite ends of an axle, comprising a brake beam connecting said shoes, a brake cylinder and piston supported horizontally at right angles to said beam and in alignment with the center thereof, a brake cylinder lever extending generally vertically and fulcrumed at an intermediate point nearer its upper end than its lower end, a second lever extending generally parallel to said brake cylinder lever and fulcrumed at an intermediate point nearer its lower than its upper end, a piston rod connecting the piston and the lower end of the brake cylinder lever, a link connecting the upper ends of the levers, and a link connecting the lower end of the second lever and the center of the brake beam.

10. Brake mechansim for a vehicle having a a wheel mounted thereon for limited lateral movement with respect thereto, comprising a brake shoe adapted to brakingly engage the wheel, a brakehead for supporting the shoe, a brake hanger for pivotally supporting the brakehead, a universal joint connecting the hanger to the vehicle to permit the head and hanger to follow the lateral movements of the wheel, a member movable to engage the hanger and move it into braking position, and means for operating said member to apply the brake shoe to the wheel, said hanger having a surface facing and substantially wider than said member so that the member engages said surface in all lateral positions of the hanger.

11. Brake mechanism for a vehicle having a wheel mounted thereon for limited lateral movement with respect thereto, comprising a brake shoe adapted to brakingly engage the wheel, a brakehead for supporting the shoe, a brake hanger for pivotally supporting the brakehead, a universal joint connecting the hanger to the vehicle to permit the head and hanger to follow the lateral movements of the wheel, a release spring biasing the hanger in a direction to disengage the brake shoe from the wheel, a member movable to engage the hanger and move it into braking position in opposition to the release spring, and means for operating said member to apply the brake shoe to the wheel, said hanger having a surface facing and substantially wider than said member so that the member engages said surface in all lateral positions of the hanger.

12. Brake mechanism for a vehicle having a pair of opposite wheels mounted thereon for limited lateral movement with respect thereto, comprising a brake shoe for each wheel, a brakehead for supporting each shoe, a brake hanger for pivotally supporting each brakehead, a universal joint connecting each hanger to the vehicle to permit the head and hanger to follow the lateral movements of the wheel, a release spring biasing each hanger in a direction to disengage its brake shoe from its associated wheel, a member movable to engage each hanger and move it into braking position in opposition to the release spring, a brake beam carrying the movable members for both of said hangers, means for operating said beam to apply the brake shoes to the wheels, said hangers having surfaces facing and substantially wider than said members so that the members engage said surfaces in all lateral positions of the hangers, a tie rod connecting the hangers on the opposite wheels and a guide connecting the tie rod to a fulcrum movable laterally with the wheels, so that the wheels, hangers, tie rod and guide move laterally together.

13. In a brake mechanism for a railway vehicle, a linkage for transmitting motion between two generally parallel rods located on opposite sides of an obstruction, comprising a first equalizer lever pivoted at its center on one of said rods, second and third equalizer levers located in planes generally perpendicular to said first equalizer lever, means operatively connecting the ends of said first lever with points on said second and third levers, fulcrum means connected to said second and third levers at other points thereon, a fourth equalizer lever generally parallel to said first lever and pivoted at its center to the other of said rods, and means operatively connecting the ends of said fourth lever with points on said second and third levers.

EMIL G. MUELLER.

REFERENCES CITED

The following references are of record in the file of this patent:

UNITED STATES PATENTS

| Number | Name | Date |
|---|---|---|
| 1,820,723 | Anderson | Aug. 25, 1931 |
| 1,914,595 | Crossman | June 20, 1933 |
| 2,169,126 | Repka | Aug. 8, 1939 |
| 2,242,015 | Mueller | May 13, 1941 |
| 2,244,215 | Pescara | June 3, 1941 |
| 2,275,916 | Mueller | Mar. 10, 1942 |
| 2,360,967 | Mueller | Oct. 24, 1944 |
| 2,406,440 | Sauer | Aug. 27, 1946 |

FOREIGN PATENTS

| Number | Country | Date |
|---|---|---|
| 14,341 | Great Britain | 1904 |